Figure 1:
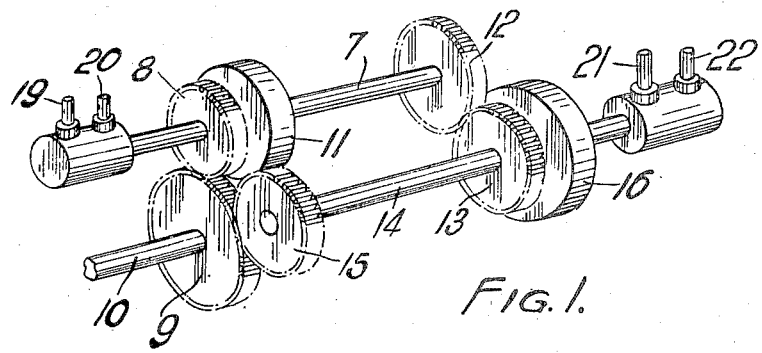

April 8, 1941.   K. W. WILLANS   2,237,647
CLUTCH MECHANISM FOR CHANGE SPEED AND REVERSING GEARING
Filed Dec. 19, 1938   2 Sheets-Sheet 1

Inventor
KYRLE WILLIAM WILLANS
by  J. Furhum
ATTORNEY

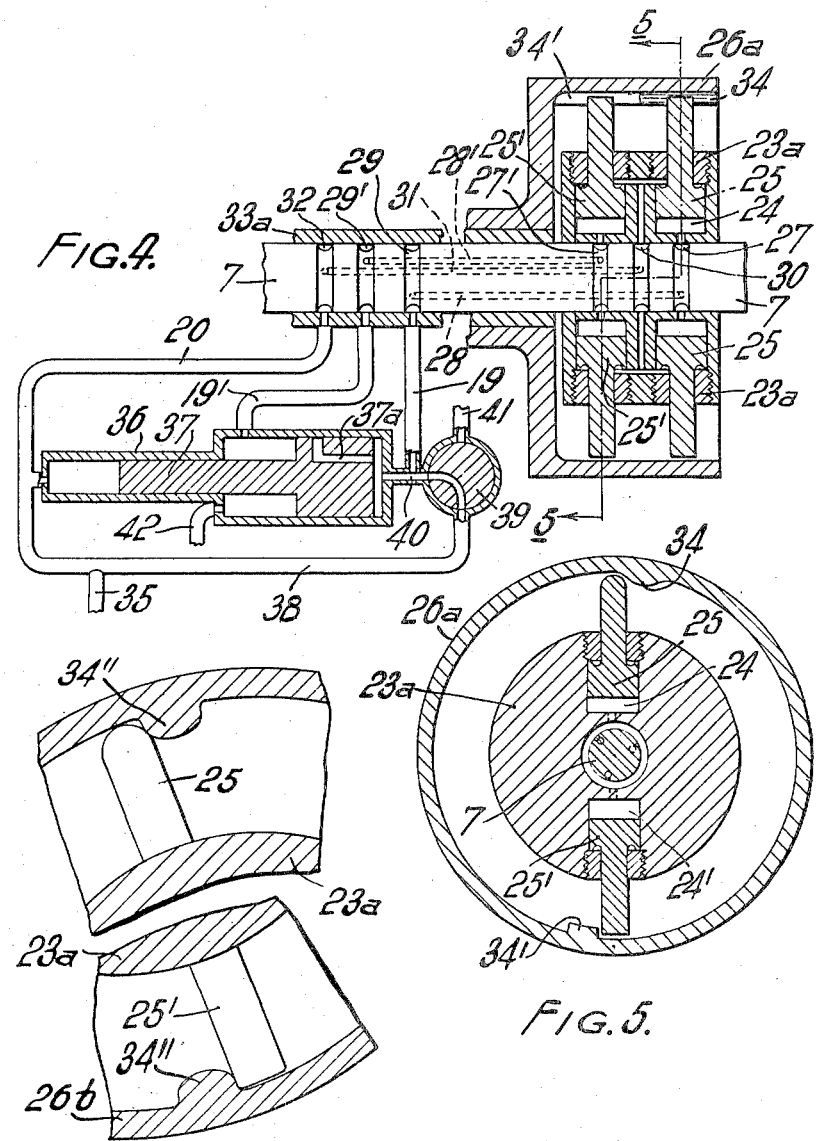

Patented Apr. 8, 1941

2,237,647

UNITED STATES PATENT OFFICE 2,237,647

CLUTCH MECHANISM FOR CHANGE SPEED AND REVERSING GEARING

Kyrle William Willans, Milton, England

Application December 19, 1938, Serial No. 246,581
In Great Britain December 15, 1937

9 Claims. (Cl. 192—86)

This invention relates to change speed and reversing gearing of the kind comprising two or more trains of constantly meshed gears which may be brought into use alternatively, each train including a gear wheel which is free upon its shaft and can be clutched thereto when it is desired to employ the train in which that gear wheel is included.

A change speed or reversing gear in accordance with the invention comprises a driving shaft, a driven shaft and a lay shaft, a pinion wheel fast on the driven shaft, a pinion loose upon the driving shaft in constant driving connection with the pinion wheel, a second pinion on the driving shaft, pinions on the lay shaft in constant driving connection with said second pinion and with the pinion wheel respectively, one of said three last mentioned pinions being loose upon its shaft, and alternatively operable means for securing each of the loose pinions to its shaft.

The clutch means for securing each of the loose pinions to its shaft may be of any suitable type giving either frictional or positive engagement and may be operated by hydraulic pressure or by a mechanical linkage or by other means. Preferably, however, the clutches are hydraulically operated and comprise radially moving plungers which work in cylinders fast upon the shaft and can be forced outwardly into frictional or positive engagement with an outer casing running loose upon the shaft by the pressure of oil or other fluid supplied through passage ways in the shaft. The outer casing may be formed on its periphery with gear teeth, thus itself constituting the pinion, but I prefer not to arrange the clutching means within the pinion itself, but to form the latter as a sleeve running loose upon the shaft and connected to, or formed integral with, the outer casing of the clutch. With this arrangement the pinions may be made smaller in diameter than the clutch and the gear as a whole made considerably more compact.

The invention also comprises an improved form of clutch, particularly suitable for use in the gears of the invention, but also capable of many other applications. A clutch in accordance with the invention comprises a block fast upon a shaft, plungers mounted in said block and movable radially thereof, a casing loose upon the shaft and surrounding the cylinder block and projections on the inner surface of the block so placed as to be engaged by the side faces of the plungers when the latter are moved outwardly of the block. Preferably the side faces of some at least of the plungers and the faces of the projections with which they engage are inclined to the radial and the means for urging these plungers radially outwards are yieldable to permit the plungers to ride over the projections and allow the clutch to slip when it is subjected to excessive load.

Further features of the invention will appear from the following description of specific embodiments thereof.

Figure 2:
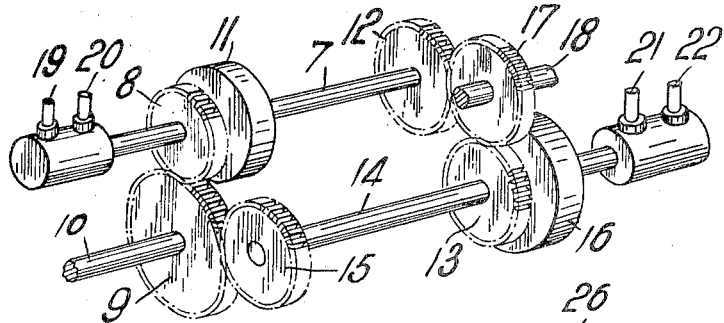
Figure 3:
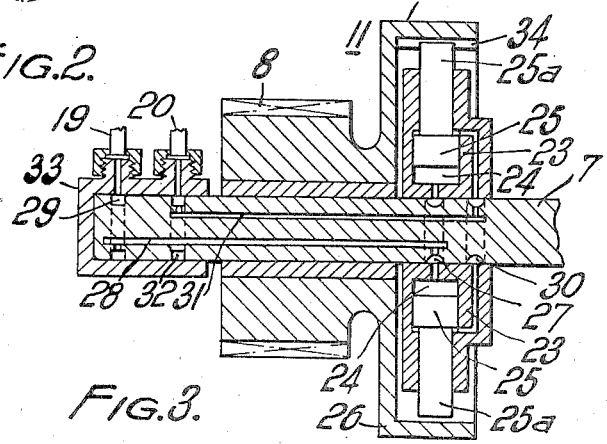

The invention is illustrated in the accompanying drawings, to which attention is now directed and in which Figure 1 shows a perspective view of a reversing gear, Figure 2 is a similar view of a modified gear giving two speeds without reversing, Figure 3 is a section through one part of the gear shown in Figures 1 and 2, Figure 4 is a view similar to Figure 3 showing a modified construction, Figure 5 is a section on the line 5—5 of Figure 4 and Figure 6 is a fragmentary view showing a modified form of the parts shown in Figure 5.

The reversing gear shown in Figure 1 comprises a driving shaft 7 having thereon a pinion 8 which meshes with a pinion wheel 9 fast on the driven shaft 10. The pinion 8 runs loose upon the shaft 7 but can be secured to that shaft by means of a clutch 11. The driving shaft 7 also carries a pinion 12 which is fast to that shaft and meshes with a pinion 13 on a lay shaft 14, this lay shaft carrying also a pinion 15 which meshes with the wheel 9 on the driven shaft. While the pinion 15 is fast upon the lay shaft, the pinion 13 is loose upon that shaft but can be secured thereto by a clutch 16. For "ahead" running, the clutch 11 is operated to secure pinion 8 to the driving shaft, while the clutch 16 is released so that pinion 13 runs loose upon the lay shaft. Power is then transmitted from the driving shaft 7 to the driven shaft 10 through pinion 8 and pinion wheel 9, so that the driven shaft is rotated in the opposite direction to the driving shaft and at a reduced speed. For "astern" running, clutch 11 is released to allow pinion 8 to run loose on the driving shaft and clutch 16 is operated to secure pinion 13 to the lay shaft. Power is then transmitted from the driving shaft through pinions 12 and 13 to the lay shaft and from the lay shaft through pinion 15 and pinion wheel 9 to the driven shaft, which is thus rotated in the same direction as the driving shaft and at a speed which is reduced to a still greater extent than for "ahead" running.

The gear shown in Figure 2 is similar in all respects to that shown in Figure 1, except that pinion 12 on the driving shaft does not mesh directly with pinion 13 on the lay shaft, but meshes with an idler pinion 17 mounted on a shaft 18, this pinion in turn meshing with pinion 13. When clutch 11 is operated to secure pinion 8 to the driving shaft and clutch 16 is released, drive is transmitted from the driving shaft to the driven shaft in the same manner as for "ahead" running in the gear of Figure 1. When, however, clutch 11 is released and clutch 16 is operated to secure pinion 13 to the lay shaft, power is transmitted from the driving shaft to the lay shaft through pinion 12, idler pinion 17 and pinion 13, so that the lay shaft rotates in the same direction as the driving shaft. From the lay shaft power is transmitted to the driving shaft through pinion 15 and wheel 9, as in the gear of Figure 1, so that the driven shaft 10 is again rotated in the opposite direction to the driving shaft but with a greater speed reduction than is obtained when clutch 11 is operated and clutch 16 released.

It will be understood that Figures 1 and 2 of the drawings are of a diagrammatic nature, parts of the gear not essential to the proper understanding of the present invention (such, for example, as the bearings for supporting the shafts 7, 10, 14 and 18) being omitted from the drawings. It will also be understood that the gears shown may be modified in various ways. For example, the position of the pinions which are fast and loose upon the shafts 7 and 14 may be interchanged in various ways. Thus pinion 13 might be fast upon shaft 14, while pinion 15 was loose thereon but clutchable thereto. Again both pinions 13 and 15 might be fast upon shaft 14 while both pinions 8 and 12 were loose upon shaft 7 but clutchable thereto. In general however it will be found more convenient to arrange the two loose pinions upon separate shafts.

While the clutches used for securing the loose pinions of my gears to their respective shafts may be of any suitable construction and may be operated by any suitable means, I prefer to make use of hydraulically operated clutches comprising radially movable pistons which work in cylinders fast upon the shaft and can be forced outwardly into frictional or positive engagement with an outer casing fast to the pinion by the pressure of oil or other fluid. The clutches 11 and 16 are of this kind, the pressure fluid being supplied to the clutches through pipes 19, 20 and 21, 22 and passage ways formed in the shafts 7 and 14, respectively. The construction of my hydraulically operated clutches and the arrangement of their hydraulic connections are illustrated in Figures 3 to 6 of the drawings, to which attention is now directed.

Figure 3 shows an axial section through the clutch means for securing pinion 8 of the gears shown in Figures 1 and 2 to the driving shaft 7 on which it is mounted. The clutch (designated in general as 11) comprises a cylinder block 23 which is fast upon the shaft 7 and is formed with a plurality of cylinders 24 in each of which a piston 25 is radially movable. An extension 25a of reduced diameter at the outer end of the piston projects through the outer end of the cylinder 24. When the piston 25 is moved to the outer end of its cylinder 24, this extension 25a is brought into frictional or positive engagement with an outer casing 26 which is fast to the pinion 8. The inner ends of the cylinders 24 communicate through passages in the cylinder block with an annular groove 27 formed around the periphery of the shaft 7, this groove 27 communicating with one end of a passage 28 which extends longitudinally through the shaft and communicates at its other end with a further annular groove 29 formed in the surface of the shaft 7 near one end of the latter. Similarly, the outer ends of the cylinders 24 communicate through passages in the cylinder block with an annular groove 30 which communicates with one end of a longitudinal passage 31 in the shaft whose other end communicates with an annular groove 32 disposed closely adjacent the groove 29. The part of the shaft 7 in which the grooves 29 and 32 are formed is closely surrounded by a stationary sleeve 33 which is formed with radial passages communicating at their inner ends with the grooves 29 and 32 and at their outer ends with pipes 19 and 20 secured to the sleeve 33. It will be seen that if pressure fluid is supplied through the pipe 19, it will be delivered to the inner ends of the cylinders 24, while pressure fluid supplied through the pipe 20 will be delivered to the outer ends of cylinders 24.

When it is desired to release the clutch 11 and allow the pinion 8 to run free upon the shaft 7, pressure is cut off from the pipe 19 and pressure fluid is supplied to the pipe 20. The pressure thus produced in the outer ends of the cylinders 24 forces the pistons inwardly against the action of centrifugal force, thus withdrawing them from engagement with the casing 26 and leaving that member and the pinion 8 free to rotate relative to the shaft 7. When it is desired to operate the clutch 11 and secure the pinion 8 to the shaft 7, pressure fluid is supplied through the pipe 19 and the pressure thus produced in the inner ends of the cylinders causes the pistons to move outwardly so that their extensions 25a engage the casing 26 and secure that member and the pinion 8 to the shaft 7. During this time the supply of pressure fluid to the pipe 19 may be shut off, but I prefer to supply pressure fluid continuously to the pipe 19, so as to simplify the construction of the control valves and ensure that the pistons will be withdrawn out of engagement with the casing 26 immediately the supply of pressure fluid through the pipe 20 is interrupted. It will be appreciated that as the area of the pistons which is exposed to the pressure fluid admitted through pipe 19 is considerably greater than the area exposed to the pressure fluid admitted through the pipe 20, the pistons will be forced outwardly when pressure fluid is supplied through the two pipes simultaneously.

As already mentioned, the engagement of the pistons 25 with the casing 26 may be either frictional or positive and such engagement may be obtained in any convenient known manner. However, I prefer to effect the engagement by providing on the inner surface of the casing 26 projections 34, against whose side faces the pistons 25 engage when they are in their protruded position, the side surfaces of these projections, or the co-operating surfaces of the pistons, or (preferably) both of these surfaces being inclined out of the radial. In this manner a positive connection between the pistons and the casing is obtained so long as the pistons remain fully protruded, but if the connection is subjected to an excessive load, the pistons are forced inwardly against the fluid pressure in the cylinders 24 and their outer ends ride over the projections 34, thus allowing the clutch to slip.

I may provide my clutches with two pistons or sets of pistons, one adapted to be brought into slipping engagement with the casing (either in the manner above described or in any other convenient manner) and the other adapted to be brought into positive engagement with the casing so as to be incapable of slipping relative thereto. These two pistons or sets of pistons may be engaged in succession, the slipping piston or pistons being first engaged and the non-slipping pistons not being engaged until later, when the members of the clutch have already been brought into synchronism.

Figures 4 and 5 of the drawings show a clutch provided in this manner with two sets of pistons and with means for causing them to be engaged in succession. The clutch is in general similar to that shown in Figure 3, but the cylinder block 23a is formed in addition to the cylinders 24 with a second similar set of cylinders 24' in which work pistons 25'. The outer ends of both sets of cylinders 24 and 24' communicate with the groove 30 and thence through passage 31 and groove 32 with pipe 20. The inner ends of cylinders 24' communicate through groove 27', passage 28' and groove 29' with pipe 19', all respectively similar to the parts 27, 28, 29 and 19. The outer ends of the side surfaces of pistons 25 and the side surfaces of the projections 34 on the casing 26a with which these pistons engage are sloped so that the pistons may ride over the projections and allow the clutch to slip when subjected to excessive load. However the outer ends of the side surfaces of pistons 25' and the side surfaces of the projections 34' with which these pistons engage are radially directed, so that a positive non-slipping engagement is obtained when the pistons 25' are protruded. Oil or other pressure fluid is continuously supplied to the clutch from a pipe 35 which is in constant communication with the pipe 20 and thus with the outer ends of the cylinders 24 and 24' and also with the smaller end of a two diameter cylinder 36 in which works a two diameter piston 37. Pipe 35 communicates also with a pipe 38 leading to a control valve 39, by means of which a pipe 40 communicating with the larger end of cylinder 36 and with pipe 19, may be placed in communication with either pipe 38 or with an exhaust pipe 41.

When valve 39 is moved to connect pipes 40 and 41, pressure fluid from the inner ends of cylinders 24 and the larger end of cylinder 36 escapes to exhaust pipe 41, while oil from the inner ends of cylinders 24' escapes through pipe 19' and cylinder 36 to a further exhaust pipe 42. The pistons 25 and 25' are thus held retracted by the fluid pressure continuously applied through pipe 20. On turning valve 39 into the position shown connecting pipes 38 and 40, pressure fluid is at once admitted through pipe 19 to the inner ends of cylinders 24, so that pistons 25 are protruded into engagement with projections 34. When the fluid pressure in the pipe system 38, 19, 28 has increased sufficiently piston 37 moves to the left thus bringing pipe 38 into communication with pipe 19' through a passage 37a in piston 37 and causing the pistons 25' to be protruded into engagement with projections 34'.

Instead of providing the clutch with two axially spaced banks of pistons adapted to engage with differently shaped projections on the clutch casing, I may employ only a single bank of pistons, all co-operating with the same projections, some of the pistons being so shaped as to allow the clutch to slip while the remaining pistons are so shaped that they effect non-slipping engagement with the projections. Figure 6 shows the form which may be given to the parts to obtain this effect. The projections 34'' on the casing 26b have the portions of their side faces nearest the casing radially directed, while the inner parts of their side faces are rounded off. The pistons 25 which give slipping engagement engage only with the non-radial portions of the side faces of projections 34'', while pistons 25' engage with the radially directed portions of the side faces of the projections, thus giving non-slipping engagement.

While the clutches described above with reference to Figures 3 to 6 of the drawings are particularly suitable for use in connection with the reversing and change speed gears described with reference to Figures 1 and 2, these clutches may also be employed for many other purposes as will be immediately obvious to those skilled in the art to which this invention relates.

What I claim and desire to secure by Letters Patent is:

1. A clutch mechanism comprising a shaft, a member fast to said shaft, a plunger slidably mounted in and adapted to extrude from said fast member, said plunger having faces inclined to the direction of movement, a second plunger slidably mounted in and adapted to extrude from said fast member, said second plunger having faces normal to the direction of movement, a member free on said shaft, and projections on said free member having faces adapted to engage corresponding faces of said plungers in their extruded position, and separately operable means adapted to force said first and said second plunger in extruded position.

2. A clutch mechanism comprising a shaft, a member fast to said shaft, a plurality of plungers slidably mounted in and adapted to extrude from said fast member, a member free on said shaft, a plurality of projections on said free member having side faces adapted to engage corresponding faces of said plungers in their extruded position, said side faces of said projections being inclined to the normal to the direction of movement, a second plurality of plungers slidably mounted in and adapted to extrude from said fast member, said second plurality of plungers being spaced apart from said first plungers, a second plurality of projections on said free member having side faces adapted to engage corresponding faces of said second plungers in their extruded position, said side faces of said second plungers being normal to the direction of movement, yieldable means for simultaneously forcing all of said first plungers into extruded position, and separately operable means for simultaneously forcing all of said second plungers into extruded position.

3. In a clutch of the character described a shaft, a member fast to said shaft, a plurality of cylinders in said fast member, a plurality of double acting pistons one in each of said cylinders, a reduced portion on each of said pistons, said pistons slidably mounted in and adapted to extrude with said reduced portions through the outer ends of the respective cylinders, a member rotatably mounted upon said shaft, projections on said rotatable member extending into the path of said reduced piston portions when the pistons are in their extruded position, a pressure fluid supply pipe communicating with the inner ends of certain of said cylinders, and a second pressure fluid supply pipe communicating with the inner ends of the others of said cylinders.

4. In a clutch of the character described a shaft, a member fast to said shaft, a plurality of radially disposed cylinders in said fast member, a plurality of double acting pistons one in each of said cylinders, a reduced portion on each of said pistons, said pistons slidably mounted in and adapted to extrude with said reduced portions through the outer ends of the respective cylinders, a member rotatably mounted upon said shaft and surrounding said cylinders, projections on the inner face of said rotatable member and adapted to engage the reduced portion of said pistons in their extruded position, a pressure fluid supply pipe communicating with the inner ends of certain of said cylinders, a second pressure fluid supply pipe communicating with the inner ends of the remainder of said cylinders, and a third pressure fluid supply pipe communicating with the outer ends of all of said cylinders.

5. In a clutch mechanism of the character described a shaft, a member fast to said shaft, a plurality of radially disposed cylinders in said fast member, a plurality of double acting pistons one in each of said cylinders, projections on said pistons, said pistons slidably mounted in and adapted to extrude with said projections through the outer ends of the respective cylinders, one group of said projections having faces inclined to the radial, a second group of said projections having faces in radial direction, a pressure fluid channel communicating with the inner ends of the cylinders of the first group, a second pressure fluid channel communicating with the inner ends of the cylinders of the second group, a member free on said shaft and surrounding said cylinders and projections, a plurality of other projections on the inner face of said free member adapted to engage the projections on said pistons in their extruded position.

6. In a clutch mechanism of the character described a shaft, a member fast to said shaft, a plurality of radially disposed cylinders in said fast member, a plurality of double acting pistons one in each of said cylinders, projections on said pistons, said pistons slidably mounted in and adapted to extrude with said projections through the outer ends of the respective cylinders, one group of said pistons having projections with faces inclined to the radial, a second group of said pistons having projections with radially directed faces, a pressure fluid channel communicating with the inner ends of the cylinders carrying the pistons of the first group, a second pressure fluid channel communicating with the inner ends of the cylinders carrying the pistons of the second group, a member free on said shaft and surrounding said cylinders and pistons, a group of projections on the inner face of said free member adapted to engage the projections on the pistons of the first group in their extruded position, said projections on the free member having side faces inclined to the radial, and a further group of projections on the inner face of said free member having radially directed side faces and adapted to engage the projections on the pistons of the second group in their extruded position.

7. A clutch mechanism comprising a shaft, a member fast to said shaft and a member free on said shaft, a first element movably mounted in and adapted to extrude from said fast member, first engaging means on said free member adapted to engage said element in its extruded position, said first element and said first engaging means being so shaped with respect to their interengaging surfaces that force exerted therebetween on rotation of said shaft produces a component acting on said element in a direction counter to its extruding movement, a second element movably mounted in and adapted to extrude from said fast member, second engaging means on said free member adapted to engage said second element in its extruded position, said second element and second engaging means being so shaped with respect to their interengaging surfaces that an exclusively rotational resultant is produced by the force exerted therebetween on rotation of said shaft, yielding means for forcing said first element into extruded position and separately operable means for forcing said second element into extruded position.

8. A clutch mechanism comprising a shaft, a member fast to said shaft and a member free on said shaft, a first set of elements movably mounted in and adapted to extrude from said fast member, first engaging means on said free member adapted to engage said set of elements in its extruded position, said first set of elements and said first engaging means being so shaped with respect to their interengaging surfaces that force exerted therebetween on rotation of said shaft produces a component acting on said set of elements in a direction counter to its extruding movement, a second set of elements movably mounted in and adapted to extrude from said fast member, second engaging means on said free member adapted to engage said second set of elements in its extruded position, said second set of elements and second engaging means being so shaped with respect to their interengaging surfaces that an exclusively rotational resultant is produced by the force exerted therebetween on rotation of said shaft, yielding means for forcing said first set of elements into extruded position, and separately operable means for forcing said second set of elements into extruded position.

9. A clutch mechanism comprising a shaft, a member fast to said shaft and a member free on said shaft, two elements movably mounted in and adapted to extrude from said fast member, engaging means on said free member adapted to engage said elements in their extruded position, the first of said elements being so shaped that force exerted on rotation of said shaft on said element by engagement with said engaging means produces a component acting on said element in a direction counter to its extruding movement, the second of said elements being so shaped that force exerted on rotation of said shaft on said element by engagement with said engaging means produces an exclusively rotational resultant, yielding means for forcing said first element into extruded position, and separately operable means for forcing said second element into extruded position.

KYRLE W. WILLANS.